(12) United States Patent
Wurnitsch et al.

(10) Patent No.: US 12,330,146 B2
(45) Date of Patent: Jun. 17, 2025

(54) INITIATOR INJECTION NOZZLE

(71) Applicant: BOREALIS AG, Vienna (AT)

(72) Inventors: Christof Wurnitsch, Linz (AT); Werner Bilina, Schwechat-Mannsworth (AT)

(73) Assignee: BOREALIS AG, Vienna (AT)

( * ) Notice: Subject to any disclaimer, the term of this patent is extended or adjusted under 35 U.S.C. 154(b) by 172 days.

(21) Appl. No.: 17/767,761

(22) PCT Filed: Oct. 13, 2020

(86) PCT No.: PCT/EP2020/078764
§ 371 (c)(1),
(2) Date: Apr. 8, 2022

(87) PCT Pub. No.: WO2021/074141
PCT Pub. Date: Apr. 22, 2021

(65) Prior Publication Data
US 2024/0082801 A1 Mar. 14, 2024

(30) Foreign Application Priority Data
Oct. 16, 2019 (EP) .................................... 19203597

(51) Int. Cl.
*B01J 4/00* (2006.01)
*B01F 25/313* (2022.01)
*B01F 25/00* (2022.01)

(52) U.S. Cl.
CPC ............. *B01J 4/002* (2013.01); *B01F 25/313* (2022.01); *B01F 2025/91* (2022.01)

(58) Field of Classification Search
CPC ...... B01F 25/313; B01F 2025/91; B01J 4/002
(Continued)

(56) References Cited

U.S. PATENT DOCUMENTS 1,120,129 A * 12/1914 Cable ........................ F24F 6/12
261/126
2,361,150 A 10/1944 Petroe
(Continued)

FOREIGN PATENT DOCUMENTS

CN 1280520 A 1/2001
CN 102369055 A 3/2012
(Continued)

OTHER PUBLICATIONS

Partial Translation of DE 10060372 A1 (Year: 2002).*
(Continued)

*Primary Examiner* — Charles S Bushey
(74) *Attorney, Agent, or Firm* — Tarolli, Sundheim, Covell & Tummino LLP

(57) ABSTRACT

The present invention relates to an initiator injection nozzle (1) for mixing an initiator with a process fluid. The initiator injection nozzle includes a body (10) having (i) a process fluid inlet port (11) to receive the process fluid and an outlet port (17); (ii) a process fluid flow passage (13) through which the process fluid traverses along a process fluid central flow axis (15) between the process fluid inlet port (11) and the outlet port (17), the process fluid flow passage 13 having a constricting portion (12), a throat (14) and an expanding portion (16); (iii) an initiator inlet (30) to receive the initiator and an initiator outlet (32); and (iv) an initiator fluid flow passage (34) through which the initiator traverses along an initiator central flow axis (35) between the initiator (inlet 30) and the initiator outlet (32), the process fluid flow passage (13) intersecting the initiator fluid flow passage (34) at the throat (14). At least one elongated vane (20) having a leading end (22) and a trailing end (26) is provided within the process fluid flow passage (13) and extends along the process fluid central flow axis (15), wherein the initiator outlet (32) is disposed on a surface (24) of the vane (20). The
(Continued)

initiator injection nozzle has the initiator outlet (32) is disposed on a portion of an axial edge (24) of the vane (20).

11 Claims, 2 Drawing Sheets

(58) Field of Classification Search
USPC .......................................................... 261/79.2
See application file for complete search history.

(56) References Cited

U.S. PATENT DOCUMENTS

| | | | | |
|---|---|---|---|---|
| 4,344,752 | A | * | 8/1982 | Gallagher, Jr. ... B01F 25/31242 137/896 |
| 5,863,128 | A | * | 1/1999 | Mazzei ............ B01F 25/31242 137/896 |
| 6,082,713 | A | * | 7/2000 | King ........................ F28C 3/06 261/79.2 |
| 6,425,531 | B1 | | 7/2002 | Nielsen |
| 7,185,626 | B2 | * | 3/2007 | Huckelberry ......... F02M 29/06 123/306 |
| 8,308,087 | B2 | | 11/2012 | Berbee et al. |
| 11,673,104 | B2 | * | 6/2023 | Sabey ............... B01F 25/31241 137/3 |
| 2005/0051914 | A1 | * | 3/2005 | Gordon ................... F24F 11/76 261/DIG. 43 |
| 2009/0065957 | A1 | * | 3/2009 | Mao ....................... F02M 25/12 261/78.2 |
| 2015/0367318 | A1 | | 12/2015 | Lester et al. |

FOREIGN PATENT DOCUMENTS

| | | | |
|---|---|---|---|
| CN | 102725056 | A | 10/2012 |
| CN | 105889035 | A | 8/2016 |
| CN | 107106219 | A | 8/2017 |
| CN | 108211838 | A | 6/2018 |
| CN | 114555217 | A | 5/2022 |
| DE | 10060372 | A1 * | 6/2002 |
| EP | 0449092 | A1 | 10/1991 |
| EP | 2944371 | A1 | 11/2015 |
| WO | 2002/48214 | A2 | 6/2002 |
| WO | WO 2007/134671 | A1 * | 11/2007 |
| WO | 2009/078899 | A1 | 6/2009 |

OTHER PUBLICATIONS

Abstract of WO 2007/134671 A1 (Year: 2007).*
Chinese Application No. 202080070609.X, Office Action dated Oct. 12, 2023.
Chinese Application No. 202080070609.X, Notice of Allowance dated Apr. 25, 2024.

* cited by examiner

INITIATOR INJECTION NOZZLE

BACKGROUND OF THE INVENTION

Polyethylene has become the most important plastic worldwide with excellent mechanical and processing properties as well as chemical resistance. Depending on its melting point, polyethylene is divided into low, medium and high density polyethylene. Each type of polyethylene has its specific industrial applications. For example, high density polyethylene is harder and stiffer than low density polyethylene, can withstand higher temperatures, is less permeable by gases and more resistant to chemicals. Low density polyethylene is more flexible and stretchable.

One of the most common manufacturing processes used to manufacture low density polyethylene involves the use of a so-called tubular reactor. Ethylene is fed as a process fluid into the reactor and is polymerized into polyethylene at a pressure of 100 to 300 MPa and at a temperature of 200 to 300° C. under the action of an initiator which is injected at discrete positions along the reactor tube. The reactor can have a length of up to 3500 m. Common initiators are oxygen or peroxide.

When the initiator is injected and mixed with the process fluid within the reaction zone of the reactor, the initiator forms free-radical decomposition products which start a free-radical polymerization reaction with ethylene (and optional co-monomers) as a result of which the ethylene-based polymer is obtained.

It is crucial for the manufacturing process of low density polyethylene that the concentration profile and mixing of the initiator and the process fluid is well balanced and uniform within the reaction zone. If the concentration profile is not sufficiently homogeneous, there will be areas within the reaction zone which have a higher degree of polymerization and more heat generation. Such areas may cause serious problems, such as build-up of high molecular weight material near the initiator port which may lead to clogging of the initiator port or even the reactor tube.

Various attempts have been made in the past to improve the mixing of the initiator with the process fluid.

EP 0 449 092 A1 uses an injection finger for the initiator which laterally protrudes into the process fluid channel.

WO 2002/48214 A2 imparts a rotational movement to the process fluid by the use of an arrangement which includes a number of spiral vanes on the outer and inner surfaces of a cylinder accommodated within the tubular reactor. The process fluid flows through the cylinder and through the annular gap between the cylinder and the tubular reactor. The cylinder is located upstream of the injection nozzle for the initiator.

U.S. Pat. No. 8,308,087 B2 uses an injection nozzle with a Venturi-shaped fluid flow passage for the process fluid which comprises a constricting portion and an expanding portion. The constricting and expanding portions cause a change of the process fluid velocity which in turn helps to improve the transport and mixing of the process fluid with the initiator.

WO 2009/078899 A1 relates to a gas mixer for mixing two gas streams. A first gas traverses through a pipe inside of which an oxygen finger is located. The oxygen exits the finger through an orifice at an axial edge of a vane.

EP 2 944 371 A1 discloses a multi-fluid mixer for mixing a first fluid with a second fluid. The multi-fluid mixer features a swirling device located in a cylindrical section of a housing. It comprises a plurality of vanes which are fixed to a conical, non-rotating hub of the multi-fluid mixer. The second fluid is injected through an orifice into the first fluid. There are other orifices for injecting the second fluid into the first fluid.

U.S. Pat. No. 6,425,531 B1 discloses an atomizer foil to mix liquid into an airflow passing through the flow duct of an atomizer. Pressurized liquid is introduced through an inlet to the atomizer foil, and exits the atomizer foil via an outlet. Air flows through an inlet and exits through an outlet of an atomizer. The atomizer foil has the shape of an airfoil. In one embodiment, the body of the atomizer may have a constricting portion, a throat and an expanding portion.

US 2015/367318 A1 discloses a mixing reactor for mixing a precursor fluid with a second fluid. The second fluid is discharged from a pipe, and the outlet of the pipe, in cross-section, may have the shape of a vane in order to improve the mixing by eliminating a stagnant region of flow adjacent to a sidewall of the pipe.

U.S. Pat. No. 2,361,150 A relates to a mixer used for mixing chlorine into a liquid stream flowing through a pipe. The chlorine is admitted into the liquid stream through nozzles. The pipe itself is a Venturi-type pipe.

BRIEF SUMMARY OF THE INVENTION

It is an object of the present invention to mitigate, if not eliminate problems associated with the prior art solutions. In particular, it is an object of the present invention to further improve mixing of the initiator with the process fluid within the reaction zone of the reactor tube.

According to the invention, an initiator injection nozzle for mixing an initiator with a process fluid is provided. The initiator injection nozzle comprises a body comprising (i) a process fluid inlet port to receive the process fluid and an outlet port, (ii) a process fluid flow passage through which the process fluid traverses along a process fluid central flow axis between the process fluid inlet port and the outlet port, wherein the process fluid flow passage has a constricting portion, a throat and an expanding portion, (iii) an initiator inlet to receive the initiator and an initiator outlet, and (iv) an initiator fluid flow passage through which the initiator traverses along an initiator central flow axis between the initiator inlet and the initiator outlet, wherein the process fluid flow passage intersects the initiator fluid flow passage at the throat. The initiator injection nozzle includes at least one elongated vane, which has a leading end and a trailing end, and which is provided within the process fluid flow passage and extends along the process fluid central flow axis, and wherein the initiator outlet is disposed on a surface of the vane. The initiator injection nozzle is characterised in that the initiator outlet is disposed on a portion of an axial edge of the vane.

Preferably, the initiator outlet is disposed in proximity of a trailing end of the vane.

It is advantageous, if the initiator fluid flow passage is straight.

According to another preferred embodiment of the invention, the initiator outlet is nozzle-shaped.

Further, it is preferred if the initiator outlet has a circular perimeter.

Preferably, a distance between the initiator outlet and the process fluid flow passage is 2 mm to 30 mm, such as 2.5 mm to 21.25 mm.

Yet another preferred embodiment of the invention requires that the trailing end of the vane encloses an angle of 60° to 90°, such as 90°, with the process fluid central flow axis.

It is further optional that the vane has a curved vane surface.

And even more preferably, a plurality of vanes are provided within the process fluid flow passage, and the initiator outlet is disposed on a surface of only one of the plurality of vanes, and the number of vanes is in a range between 3 to 8, preferably is 4 or 6.

It is advantageous if the trailing end of the vane terminates at the throat.

Preferably, the constricting portion is sloped towards the process fluid central flow axis by an angle of 10° to 20°, such as 15°, relative to the process fluid central flow axis, and the expanding portion is sloped away from the process fluid central flow axis by an angle of 10° to 20°, such as 12.5° relative to the process fluid central flow axis.

The foregoing summary as well as the following detailed description will be better understood when read in conjunction with the appended drawings. The appended drawings mainly serve the purpose to clearly illustrate the principles of the present invention. Moreover, in the drawings, like reference numerals designate corresponding parts throughout the drawings. It should be borne in mind, however, that the invention is not limited to the precise features indicated in the drawings and described below in the context of a preferred embodiment of the invention.

DETAILED DESCRIPTION OF THE INVENTION

Figure 1:
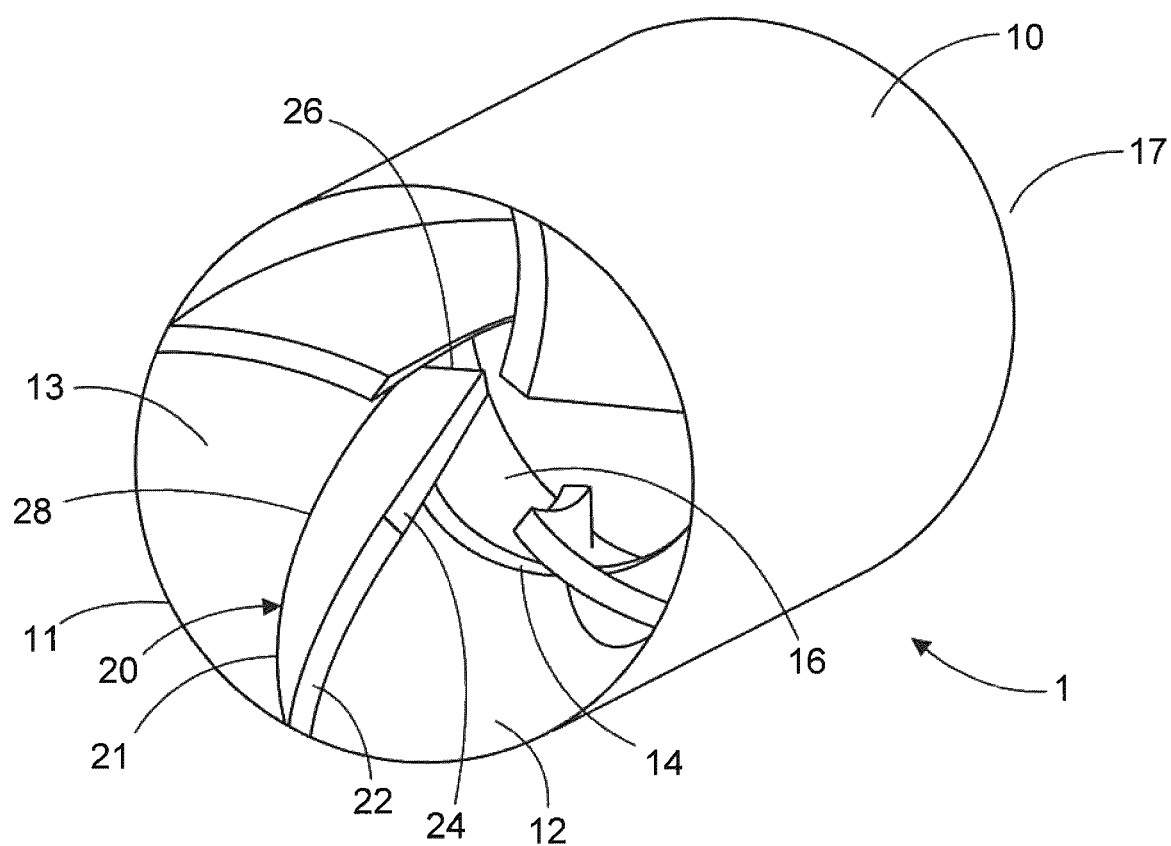
FIG. 1 is a perspective view of an initiator injection nozzle according to a preferred embodiment of the invention.

A "process fluid" as used in the following detailed description may include ethylene and possibly any co-monomers. An "initiator" may include peroxide or oxygen.

The term "vane" may be understood to include any structure that guides the process fluid in a direction different to its flow direction along the process fluid central flow axis. A "passageway" may be formed by any suitable process, such as a mechanical process, for example drilling, or may be formed when two mating components are fixed together. The term "surface" should be understood as any face of the structure being in contact with the fluid.

The initiator injection nozzle 1 according to a preferred embodiment of the invention includes a body 10 which is mounted to a reactor tube by using conventional means. Such conventional means include, for example, flange-type connecting means. These connecting means, however, are not shown in FIG. 1 for the sake of simplicity.

The inner diameter of the reactor tube is 20 mm to 120 mm, preferably 25 mm to 85 mm.

The body 10 generally includes three sections which are a constricting portion 12, a throat 14 and an expanding portion 16. The diameter of the constricting portion 12 reduces gradually from a diameter D2 to a diameter D1 which is smaller than D2. The expanding portion 16 has a diameter that gradually increases from the diameter D1 to a diameter D3 which might well be equal to or different to the diameter D2. In between the constricting portion 12 and the expanding portion 16 is a throat 14 which exhibits the smallest diameter D1. The three portions 12, 14 and 16 thus form a Venturi-type passageway 13.

When the initiator injection nozzle 1 is being in operation, a process fluid, such as for example ethylene (and optional co-monomers), enters the initiator injection nozzle 1 through the process fluid inlet port 11, then traverses along a process fluid central flow axis 15 (FIG. 2) until it exits the initiator injection nozzle 1 through the outlet port 17.

A plurality of guiding vanes 20 are provided within the constricting portion 12 of the body 10 and are firmly attached to the inner surface thereof. The number of guiding vanes 20 may vary upon the desired properties and other process requirements. In the preferred embodiment of the invention, four or six guiding vanes 20 are arranged within and equidistantly around the perimeter of the frusto-conical shaped constricting portion 12 of the body 10.

The guiding vanes 20 are now described in an exemplary manner by only one of them which can be best seen in FIG. 1. Preferably, all guiding vanes 20 have the same geometry.

This guiding vane 20 has a leading end 22 and a trailing end 26 as seen in the flow direction of the process fluid. Between the leading end 22 and the trailing end 26 is located an axial edge 24. Despite the fact that the axial edge 24 does not extend parallel to the process fluid central flow axis 15, it can well be considered to extend essentially along or in a longitudinal direction of the body 10.

The guiding vane 20 has at least one curved surface 21 which, as can be seen in FIG. 1, is preferably convexly shaped. Preferably, the curved surface 21 extends between the leading end 22 and the trailing end 26. The vane surface on the opposite side of the guiding vane 20 is preferably also curved, preferably concavely shaped. The guiding vane 20 is attached to the inner surface of the constricting portion 12 of the body 10 which results in a curved line of contact 28 (penetration line 28) between the guiding vane 20 and the inner surface of the constricting portion 12 of the body 10. It goes without saying, that there are two lines of contact on both sides of the material thickness of the guiding vane 20 which, assuming a uniform material thickness, always have the same distance to each other.

It can also be taken from FIG. 1 that the leading end 22 is tilted towards the trailing end 26. Preferably, the leading end 22 is in addition concavely shaped. As a result, the upper portion of the leading end 22 which merges into the axial edge 24 is located closer to the trailing end 26 than the opposite lower portion which is located in proximity to the inner surface of the constricting portion 12 of the body 10.

The height of each vane 20 might be equal or might alternate with every second guiding vane 20 having the same height measured in a radial direction of the body 10.

Figure 3:
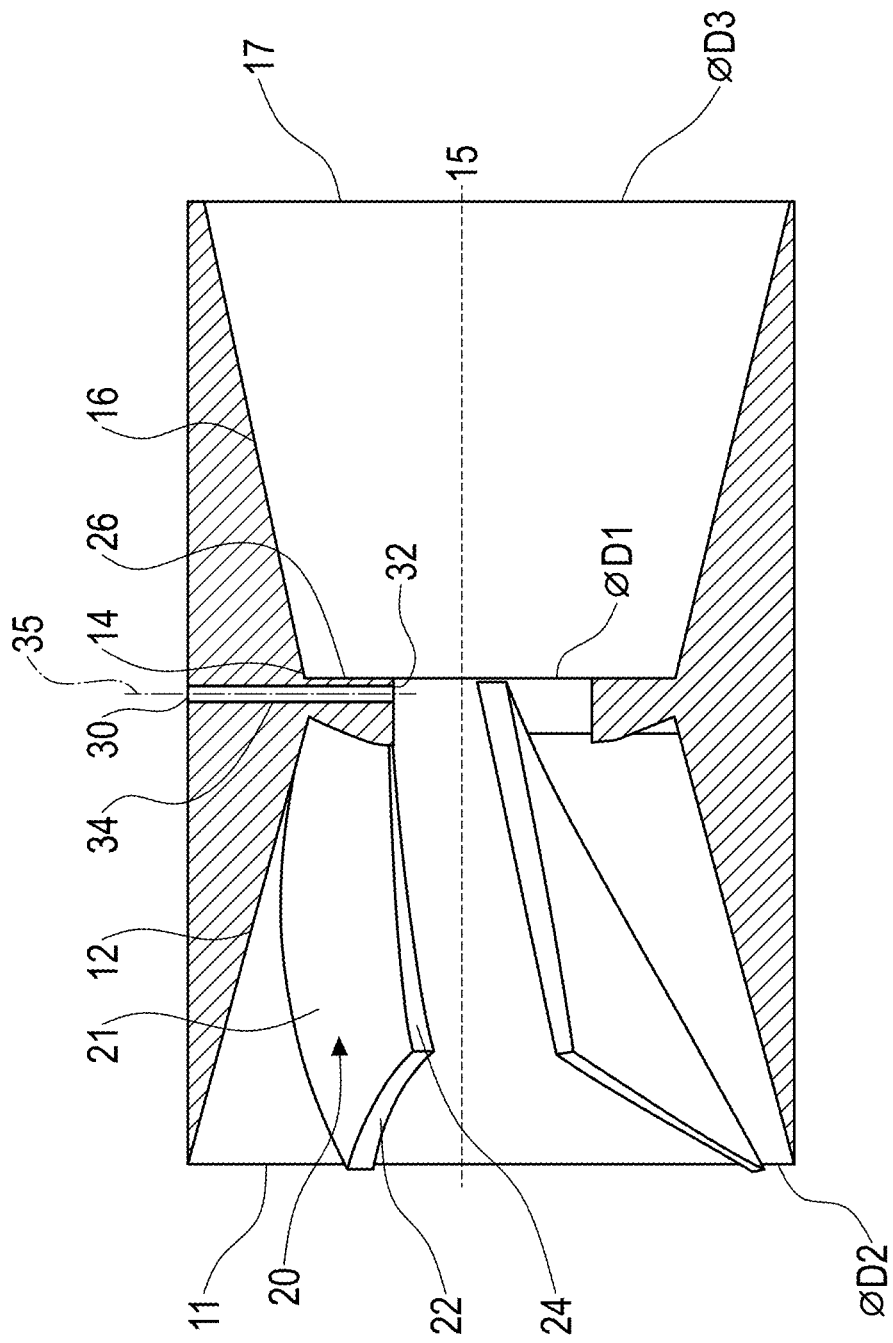
FIG. 3 is a longitudinal sectional view through the initiator injection nozzle of FIG. 1 along the process fluid central flow axis.

As can be seen in FIG. 1 and FIG. 3, all guiding vanes 20 terminate at the throat with the trailing end 26 of each vane 20 preferably extending perpendicular to the process fluid central flow axis 15.

Irrespective of the number of guiding vanes 20 being provided within the constricting portion 12 of the body 10, they are preferably oriented uniformly so as to impart a rotational movement to the process fluid in the same direction.

In operation, when the process fluid enters the inlet port 11 of the body 10 and flows over the curved surface 21 of the guiding vanes 20, the longitudinal movement of the process fluid along the process fluid central flow axis 15 will be superimposed by a rotational movement, thus creating a process fluid vortex within the constricting portion 12 of the body 10. Due to the trailing end 26 of the guiding vane 20 extending radially and perpendicular to the process fluid central flow axis 15, the process fluid flow will suddenly disrupt at the trailing end 26, thus causing Eddy currents downstream of the trailing end 26. These Eddy currents will further improve the mixing of the process fluid with the initiator injected through the initiator inlet 30 (FIG. 3).

Figure 2:
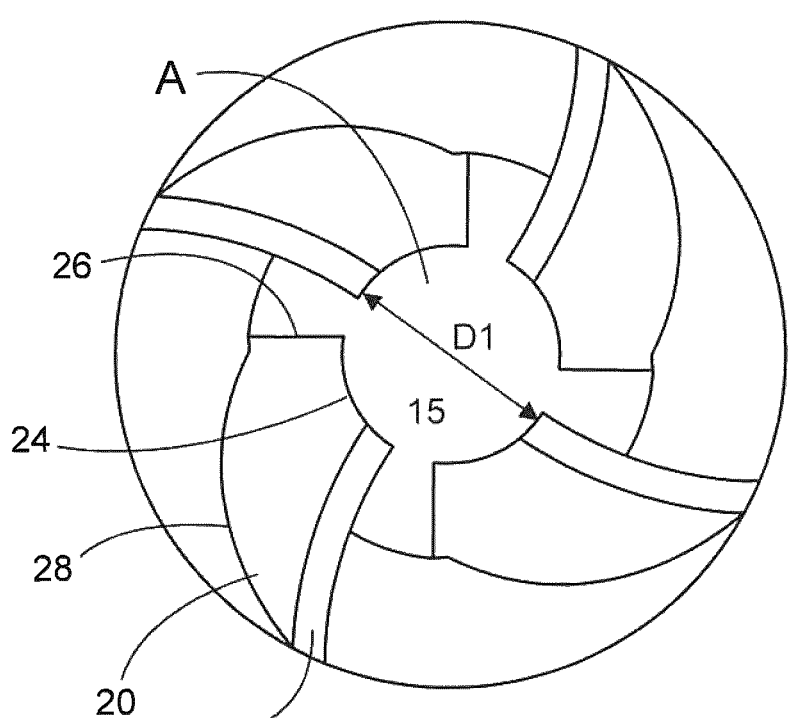
FIG. 2 is a cross-sectional view perpendicular to the flow axis of the process fluid showing the trailing ends of the guiding vanes of FIG. 1.

With reference to FIG. 2, it can clearly be seen that the guiding vanes 20 do not occupy the entire cross-sectional area perpendicular to the process fluid central flow axis 15 in each portion or section of the body 1. There will be an unobstructed process fluid flow cross-section A at each position along the process fluid central flow axis 15. In other words, if the body 10 is cut into thin slices along the process fluid central flow axis 15 (the area of each slice being perpendicular to the process fluid central flow axis 15), there will always be a cross-sectional area A that is unobstructed. This unobstructed area A includes the process fluid central flow axis and may vary along the length direction of the body 10. In the preferred embodiment of the invention, the area of the unobstructed process fluid flow cross-section A becomes larger with increasing distance from the process fluid inlet port 11, i.e. towards the process fluid outlet port 17.

The longitudinal sectional view of FIG. 3 clearly shows the Venturi-type body 10 and how the unobstructed area A of the process fluid flow cross-section varies in the longitudinal direction of the body 10. In addition, FIG. 3 clearly shows the initiator inlet 30, the initiator outlet 32 and the initiator fluid flow passage 34 defining an initiator central flow axis 35. According to the preferred embodiment of the invention, the initiator fluid flow passage 34 extends in a radial direction of the body at a position which corresponds length-wise to the throat 14 of the body 10. Hence, the process fluid flow passage 15 intersects the initiator fluid flow passage 35 at the throat 14. The initiator fluid flow passage 34 extends through one of the guiding vanes 20 at a position which is in proximity to the trailing end 26 thereof. The position does not coincide with the trailing end 26 as the initiator fluid flow passage 34 has to be closed circumferentially. The initiator fluid flow passage 34, however, is located nearest to the trailing end 26 of one of the guiding vanes 20. The initiator outlet 32 is preferably nozzle-shaped and is provided on the axial edge 24 of the respective guiding vane 20. The initiator outlet 32 has preferably a circular perimeter, but might as well have other configurations, if needed.

A specific example of a preferred embodiment of the invention includes the following dimensions of the guiding vanes 20 and the body 10. The leading end 22 is tilted by a tilt angle of 40° to 70°, such as 60°, relative to the process fluid central flow axis 15. The trailing end 26 extends perpendicular to the process fluid central flow axis 15. The length measured along the process fluid central flow axis 15 of each vane 20 is preferably 65 mm, and the wall thickness amounts to 2 mm to 10 mm, such as 4 mm. The surface 21 of each vane 20, which preferably extends between the leading end 22 and the trailing end 26, is curved by 1° per mm length. The body 10 is Venturi-shaped in that the constricting portion 12 has an inlet angle of 15° relative to the process fluid central flow axis 15 and the expanding portion 16 has an outlet angle of 12.5°. The open diameter at the throat 14 (without any guiding vanes 20) is 30% to 80% of the inner diameter of the tubular reactor. In other words, the open diameter at the throat 14 is 6 mm to 96 mm, preferably 7.5 mm to 68 mm, more preferably 16 mm to 36 mm, such as 20 mm to 25.5 mm. The open diameter D1, that means the unobstructed diameter between the axial edges 24 of the vanes 20 and the process fluid central flow axis 15 at the throat 14 is 20% to 50% of the inner diameter of the tubular reactor. In other words, the open diameter at the throat is 4 mm to 60 mm, preferably 5 mm to 42.5 mm, more preferably 10 mm to 24 mm, such as 12.5 mm to 17 mm. The diameter of the open unobstructed area A at the process fluid inlet port 11 is 30% to 80% of the inner diameter of the tubular reactor. In other words, the open unobstructed area A at the process fluid inlet port has a diameter of 6 mm to 96 mm, preferably 7.5 mm to 68 mm, more preferably 16 mm to 36 mm, such as 20 mm to 25.5 mm.

Due to the fact that the body 10 has a Venturi-type shape which effects an acceleration of the process fluid entering the inlet port 11 and due to the provision of a number of guiding vanes 20 inside the constricting portion 12 of the body 10, the process fluid flow is sufficiently fast and turbulent at the position where the initiator is injected into the process fluid flow passage 13. In addition, the guiding vanes 20 further minimize or even eliminate any wall friction effects in that the process fluid flow velocity is increased in proximity to the internal surfaces of the constricting portion 14 of the body 10. Because the initiator is injected nearer to the process fluid central flow axis 15, no initiator layer will build up close to the wall of the body 10. And as the initiator outlet 32 is flush with the axial edge 24 of the respective guiding vane 20 prevents the formation of a gel at the initiator outlet 32 as would otherwise be the case if part of the initiator fluid flow passage 34 and the initiator outlet 32 would protrude beyond the axial edge 24 of the guiding vane 20.

The invention claimed is:

1. An initiator injection nozzle for mixing an initiator with a process fluid, comprising a body comprising:
    a process fluid inlet port to receive the process fluid and an outlet port;
    a process fluid flow passage through which the process fluid traverses along a process fluid central flow axis between the process fluid inlet port and the outlet port, the process fluid flow passage being defined by the body and having a constricting portion, a throat and an expanding portion in that order from the process fluid inlet port to the outlet port, thus forming a Venturi-type process fluid flow passage;
    an initiator inlet to receive the initiator and an initiator outlet; and
    an initiator fluid flow passage through which the initiator traverses along an initiator central flow axis between the initiator inlet and the initiator outlet, the process fluid flow passage intersecting the initiator fluid flow passage at the throat;
    wherein at least one elongated vane having a leading end and a trailing end is provided within the process fluid flow passage and extends along the process fluid central flow axis,
    wherein the initiator outlet is disposed on a surface portion of an axial edge of the vane.

2. The initiator injection nozzle of claim 1, wherein the initiator outlet is disposed in proximity of a trailing end of the vane.

3. The initiator injection nozzle of claim 1, wherein the initiator fluid flow passage is straight.

4. The initiator injection nozzle of claim 1, wherein the initiator outlet is nozzle-shaped.

5. The initiator injection nozzle of claim 1, wherein the initiator outlet has a circular perimeter.

6. The initiator injection nozzle of claim 1, wherein a distance between the initiator outlet and the process fluid central flow axis is 2 mm to 30 mm.

7. The initiator injection nozzle of claim 1, wherein the trailing end of the vane encloses an angle of 60° to 90° with the process fluid central flow axis.

8. The initiator injection nozzle of claim 1, wherein the vane has a curved vane surface.

9. The initiator injection nozzle of claim 1, wherein a plurality of vanes are provided within the process fluid flow passage, and wherein the initiator outlet is disposed on a surface portion of an axial edge of only one of the plurality of vanes, and wherein the number of vanes is in a range between 3 to 8.

10. The initiator injection nozzle of claim 1, wherein the trailing end of the vane terminates at the throat.

11. The initiator injection nozzle of claim 1, wherein the constricting portion is sloped towards the process fluid central flow axis by an angle of 10° to 20° relative to the process fluid central flow axis, and wherein the expanding portion is sloped away from the process fluid central flow axis by an angle of 10° to 20° relative to the process fluid central flow axis.

* * * * *